United States Patent
Silveira et al.

(10) Patent No.: US 11,874,926 B2
(45) Date of Patent: Jan. 16, 2024

(54) MEASURING CONTAINERS

(71) Applicant: HEWLETT PACKARD ENTERPRISE DEVELOPMENT LP, Houston, TX (US)

(72) Inventors: Francisco Plinio Oliveira Silveira, Rio Grande do Su (BR); Nigel John Edwards, Bristol (GB); Ludovic Emmanuel Paul Noel Jacquin, Bristol (GB); Guilherme de Campos Magalhaes, Rio Grande do Su (BR); Leandro Augusto Penna dos Santos, Rio Grande do Su (BR); Rodrigo Jose da Rosa Antunes, Rio Grande do Su (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 229 days.

(21) Appl. No.: 17/113,161

(22) Filed: Dec. 7, 2020

(65) Prior Publication Data
US 2022/0179959 A1    Jun. 9, 2022

(51) Int. Cl.
G06F 21/00    (2013.01)
G06F 21/57    (2013.01)

(52) U.S. Cl.
CPC .......... *G06F 21/57* (2013.01); *G06F 21/577* (2013.01); *G06F 2221/033* (2013.01)

(58) Field of Classification Search
CPC .. G06F 21/57; G06F 21/577; G06F 2221/033; G06F 21/575; G06F 21/53
See application file for complete search history.

(56) References Cited

U.S. PATENT DOCUMENTS

| | | | |
|---|---|---|---|
| 8,209,593 B2 | 6/2012 | Park et al. | |
| 8,949,913 B1* | 2/2015 | Thakkar | H04N 21/2383 725/116 |
| 10,055,578 B1* | 8/2018 | Marquardt | G06F 21/44 |
| 10,586,042 B2 | 3/2020 | Stopel et al. | |
| 10,656,845 B2 | 5/2020 | Jeong | |

(Continued)

FOREIGN PATENT DOCUMENTS

CN    105069353 A    11/2015

OTHER PUBLICATIONS

Bélair et al., "Leveraging Kernel Security Mechanisms to Improve Container Security: a Survey", Proceedings of the 14th International Conference on Availability, Reliability and Security, Aug. 2019, 7 pages.

(Continued)

*Primary Examiner* — Ghazal B Shehni
(74) *Attorney, Agent, or Firm* — Trop, Pruner & Hu, P.C.

(57) ABSTRACT

A process includes, in a computer system, acquiring a first measurement that corresponds to a software container. Acquiring the measurement includes a hardware processor of the computer system measuring a given layer of a plurality of layers of layered file system structure corresponding to the software container. The given layer includes a plurality of files, and the first measurement includes a measurement of the plurality of files. The process includes storing the first measurement in a secure memory of the computer system. A content of the secure memory is used to verify an integrity of the software container.

23 Claims, 8 Drawing Sheets

(56) References Cited

U.S. PATENT DOCUMENTS

2019/0034617 A1* 1/2019 Scarlata .................. G06F 21/44
2019/0156023 A1* 5/2019 Gerebe ................... G06F 21/44
2019/0227810 A1 7/2019 Jacquin et al.
2020/0250319 A1* 8/2020 Bacher .................. G06F 16/116

OTHER PUBLICATIONS

Docker, "Content trust in Docker", Docker Documentation, available online at <https://docs.docker.com/engine/security/trust/>, 2020, 8 pages.
Luo, W., et al., "Container-IMA: A Privacy-Preserving Integrity Measurement Architecture for Containers," 22nd International Symposium on RAID (2019); 14 pages.

* cited by examiner

MEASURING CONTAINERS

BACKGROUND

A computer platform (e.g., a server) may be subject to a security attack in which an external entity seeks to access information that is stored on the computer platform or harm components of the computer platform. For purposes of preventing or at least inhibiting such security attacks, the computer platform may have various mechanisms to limit access, such as firewalls, passwords, keys, and so forth. Moreover, measurements of the computer platform may be analyzed to identify and mitigate security attacks. For this purpose, the computer platform may regularly measure its software components and log the measurements. The measurement logs, along with verifiable proof of the authenticity of the measurement logs, may be sent to a remote verifier or other entity for analysis.

DETAILED DESCRIPTION

A computer platform may, from time to time, take integrity measurements (also called "measurements" herein) of its software components (e.g., drivers, an operating system, a bootloader, virtual machines, containers, and so forth). In this context, an "integrity measurement" (or "measurement") of a software component refers to data that represents evidence that may be analyzed to evaluate the integrity of the software component, i.e., determine, based on the data, whether or not the software component has been compromised. In general, logged integrity measurements may be analyzed and compared to baseline references (e.g., signatures, hashes, values, and so forth) for such purposes as evaluating whether the computer platform is considered trustworthy, determining whether the computer platform has been subject to a security attack, identifying security vulnerabilities, identifying software components that have been compromised, and so forth.

An integrity measurement of a software component may have many different potential forms. As examples, an integrity measurement may be a plaintext metadata value that represents a characteristic of a software component; a tuple of metadata values that represent different characteristics of a software component; a hash value representing a fingerprint of a file accessed by the software component; a hash value representing a fingerprint of an executable of the software component and inputs to the executable; a hash value representing a fingerprint of a particular sequence of files accessed by the software component; and so forth.

A trusted computing base (TCB) of the computer platform may take and log the integrity measurements of the platform. Here, a "trusted computing base" refers to a set of hardware, firmware and/or software components of the computer platform, which form the core of security for the platform. In other words, the TCB may be inherently trusted software, hardware, or some combination thereof.

Remote attestation is a process that allows a computer platform to prove to a remote verifier (e.g., a server) that the computer platform is trustworthy. More specifically, a remote verifier may challenge the computer platform with an attestation request, and in response to the attestation request, the computer platform may send integrity measurement logs to the remote verifier, along with proof (e.g., a signed digest of measurement hashes) that the integrity measurement logs are authentic. After the authenticity of the integrity measurement logs are verified, the remote verifier or another entity may analyze the integrity measurement logs to evaluate possible security concerns for the computer platform, and if the computer platform has been comprised, recommend and/or provide corresponding mitigation remedies for the computer platform.

The TCB of the computer platform may take integrity measurements of the computer platform in response to a number of different events, such as the start-up, or boot-up, of the computer platform; an attestation request or challenge; a software component starting; a file being accessed; and so forth. In accordance with example implementations, the computer platform may store one or multiple logs of integrity measurements in a non-volatile memory of the computer platform; and for purposes of proving that the logs are authentic, the computer platform may store hashes derived from the measurement logs in a secure, trusted memory of the computer platform, such as platform configuration register (PCR) memory inside a trusted platform module (TPM). In response to an attestation challenge from a remote verifier, the computer platform may provide the integrity measurement logs and provide an authenticated digest of the hashes stored in the PCR memory to prove that the integrity measurement logs are authentic.

In accordance with example implementations that are described herein, the computer platform may, in response to certain triggering events, perform integrity measurements of a software container of the computer platform. In this context, a "container" (also called an "instantiated container," "container instance, or "software container" herein) generally refers to a virtual run-time environment for one or multiple applications and/or application modules, and this virtual run-time environment is constructed to interface to an operating system kernel. A container for a given application may, for example, contain the executable code for the application and its dependencies, such as system tools, libraries, configuration files, executables and binaries for the application. In accordance with example implementations, the container contains an operating system kernel mount interface but does not include the operating system kernel. As such, a given computer platform may, for example, contain multiple containers that share an operating system kernel through respective operating system kernel mount interfaces. Docker containers and rkt containers are examples of software containers.

The container is a run-time entity that has a corresponding overlay file system. As described further herein, the overlay file system has a layered file system structure, which includes lower layers that correspond to a container image and an upper layer that serves as the workspace for the file system. An instantiated container is created at load-time from the container image, and multiple instantiated containers may be created from the same container image.

The container image forms immutable layers of the container's overlay file system. Here, the "immutable" nature of the container image means that the container image and the corresponding lower layers of the overlay file system formed from the container image are supposed to be read-only (i.e., are not supposed to be modified). The container image contains directories, files, executables, libraries, and so forth. A base layer of the container image contains a root file system (i.e., contains the root file directory and files) and basic configuration for the root file system (e.g., the entry point of the root file system, environment variables, and so forth). The container image may also contain one or multiple layers (called "intermediate layers") above the base layer. Collectively, the layers of the container image form a layered file system (called a "container image file system" herein).

In accordance with example implementations, the container's overlay file system is a union file system, which allows files and directories of different file systems to be overlaid to form a single coherent file system. More specifically, the container's overlay file system includes a lower directory, which is formed from the container image file system. The lower directory is read only, which is consistent with the container image being immutable. The container's overlay file system also includes an upper directory, which contains a container layer to which files may be read and written.

Due to the union file system, in general, files in the layers that share the same paths are merged together, with the uppermost layer file versions controlling the views of the files. For example, in a copy-on-write operation, a file may be read from the lower directory, modified and then written in the modified form to the upper directory; and the modified file is seen through the container mount, although the file has not been changed in the lower directory. As another example, a file that does not exist in the lower directory may be created and stored in the upper directory; and as another example, a file of the upper directory may be deleted, although the file may be present in the lower directory.

Instantiated containers may share container image layers, which may be advantageous from both the standpoint of reusing frequently-used image layers and conserving storage resources. For example, a container image base layer may correspond to a particular database management application, such as a particular Structured Query Language (SQL) database management application. A user may, for example, want to create a container that has the base features of the SQL database management application but is further customized with certain statistical tools. The user may, for example, use a container build engine or a container engine to construct a container build file, which specifies the base layer of the SQL database management application to be the parent, base layer of the container image and further specifies another layer for the container image, which corresponds to a particular statistical package. The container having the SQL database management application with the statistical package may be, for example, bind mounted to another container that contains the same base layer for read only access; and accordingly, the reuse of the base layer does not consume additional storage resources.

Container measurements may be made at load-time as well as at run-time. One way to take an integrity measurement of a container is by measuring, at load-time, the entire container image by calculating a hash value that represents the entire container image. Due to the immutable nature of the container image, the calculated hash value should not vary from an expected hash value for the container image.

In this context, a "hash" (also called a "hash value" herein) is produced by the application of a cryptographic hash function to a value (e.g., an input, such as an image). A "cryptographic hash function" may be a function that is provided through the execution of machine-readable instructions by a processor (e.g., one or multiple central processing units (CPUs), one or multiple CPU processing cores, and so forth). The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

Measuring a container by calculating a hash over the entire container image may be inefficient from both processing resource and memory resource standpoints. In this manner, multiple containers may share base layers and possibly intermediate layers, and as such, calculating hashes from the entireties of the container images may involve unnecessary hash processing.

In accordance with example implementations that are described herein, an agent of a computer platform performs layer-oriented integrity measurements of a container. In this context, the agent performing one or multiple "layer-oriented container integrity measurements" refers to the agent determining one or multiple integrity measurements for a given layer of a container image (at load-time) or a given layer of a container's overlay file system (at run-time).

As a more specific example of the layer-oriented container integrity measurements, in accordance with some implementations, the agent may calculate a hash for each individual file of a layer, and the resulting hashes correspond to a set of measurements for the layer. As another example, in accordance with some implementations, the agent may calculate hashes for groups of files (e.g., hashes for different sub-directories), and these hashes correspond to a set of measurements for the group of files (e.g., certain directories). Layer-oriented container integrity measurements for individual files or groups of files may be particularly advantageous for purposes of detecting file tampering. In accordance with further implementations, if the goal is not to detect file tampering, the agent may calculate a single hash value, which serves as the measurement for the entire layer.

In accordance with example implementations, the agent may measure multiple layers of the container image. For example, the agent may calculate one or multiple hashes (depending on whether file tampering is to be detected) for the base layer and for each intermediate layer of the container image. As the layers of the container image are immutable, the measurements should correspond to expected values. In a similar manner, the agent may also measure one or multiple layers of the instantiated container's overlay file system. The intermediate and base layers of the instantiated container's file system should correspond to expected values, as these layers are immutable. The agent may, in accordance with example implementations, measure the upper container layer of the overlay file system. Although the container layer is dynamic in nature, the measurement of the container layer may involve the agent generating individual file and/or group measurements for the container layer, thereby allowing certain files and/or directories to be analyzed or ignored in the analysis of the measurements of the container layer.

The agent may, in accordance with example implementations, take integrity measurements other than layer-oriented integrity measurements. For example, in accordance with some implementations, the agent may read container image metadata to form corresponding measurements, read instantiated container file system metadata to form corresponding measurements, measure files when accessed during the run-time of the container, and so forth.

As described further herein, in accordance with example implementations, the agent may take the integrity measurements in response to certain container-related events, such as container start-up requests, file access requests, container capture requests, attestation requests, and so forth. As also described further herein, in accordance with example implementations, the agent logs, or records, the integrity measurements to create one or multiple worklog integrity logs; and the agent stores hashes representing the logged integrity measurements in a secure memory of a security module of the computer platform so that a remote verifier may use an authenticated digest of the hashes (provided by the security module) to verify that the workload integrity log(s) are trustworthy.

Figure 1:
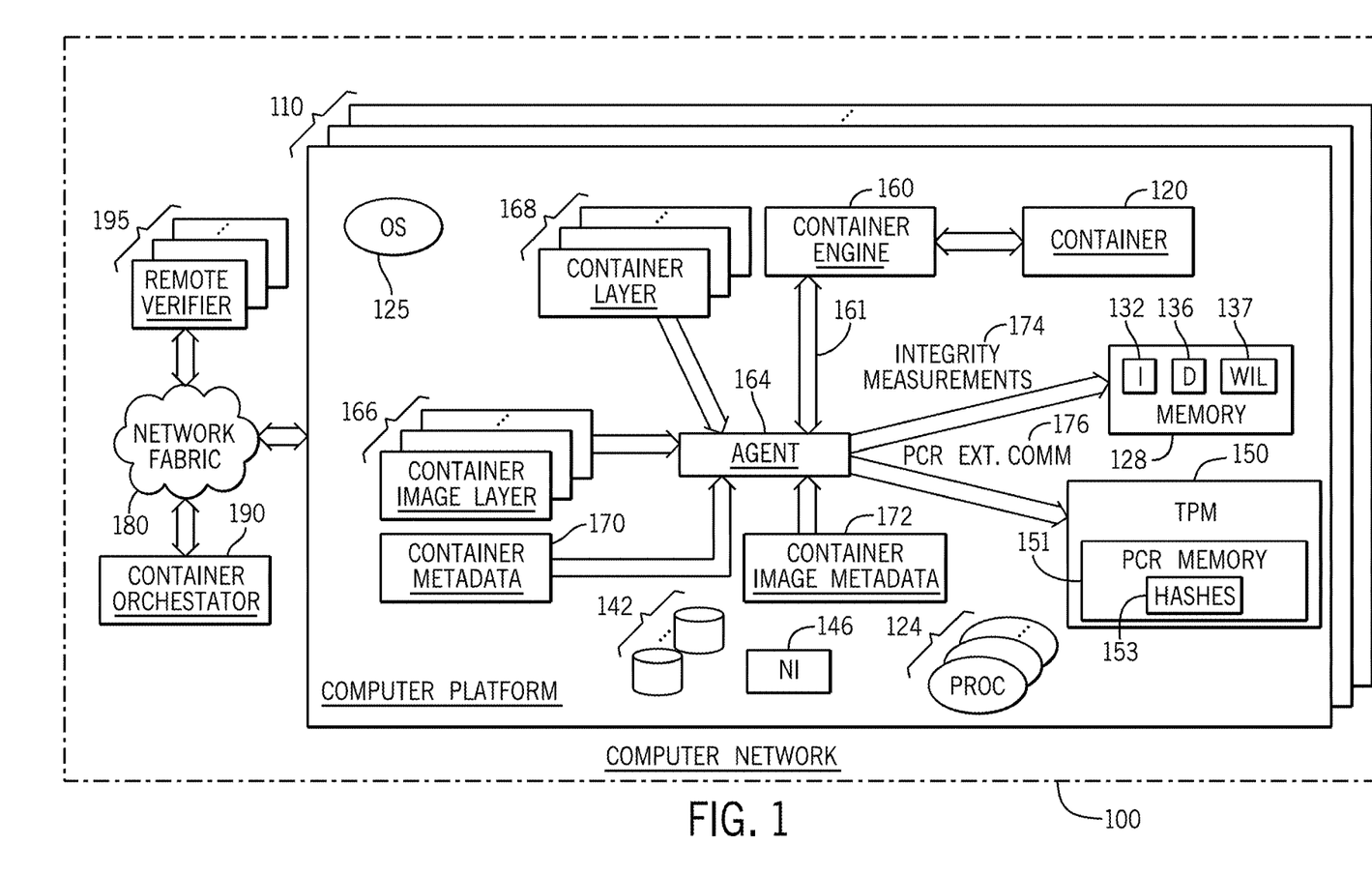
FIG. 1 is a schematic diagram of a computer network that includes an agent to measure container image and container instantiations according to an example implementation.

Referring to FIG. 1, as a more specific example, in accordance with some implementations, a computer network 100 may include one or multiple computer platforms 110; and, as illustrated in FIG. 1, a particular computer platform 110 may execute one or multiple container instantiations, or "containers 120." In accordance with example implementations, the computer platform 110 may be any processor-based device, such as a server, a client, a thin client, a desktop, a portable computer, a laptop computer, a tablet computer, a notebook computer, a smartphone, a wearable computer, and so forth.

The container 120 may be associated with a "node," which refers to a unit of processing resources, which is sufficient to execute the container 120. The node may be an actual, or physical, node, such as a node that is formed from the computer platform 110 or partition thereof; or, in accordance with other example implementations, a given node may be a virtual node, such as a virtual machine that exists on the physical computer platform 110.

The computer platform 110 may have any of a number of different architectures. For the example architecture depicted in FIG. 1, the computer platform 110 includes one or multiple processors 124 (e.g., one or multiple central processing units (CPUs), one or multiple CPU processing cores, and so forth). Moreover, the computer platform 110 may have other associated hardware, such as a memory 128; a network interface 146; a security module, such as a trusted platform module (TPM) 150; mass storage devices 142; input/output (I/O) devices; and so forth.

The memory 128, in general, represents non-transitory storage media of the computer platform 110. The memory 128 may be formed from semiconductor storage devices, memristor-based storage devices, magnetic storage devices, phase change memory devices, a combination of devices of one or more of these storage technologies, and so forth. Moreover, the memory 128 may represent a collection of memories of both volatile memory devices and non-volatile memory devices.

In accordance with example implementations, the memory 128 stores data representing one or multiple workload integrity logs 137. In accordance with some implementations, a workload integrity log 137 is associated with a particular container 120 and contains entries; and each entry of the workload integrity log 137 corresponds to a different integrity measurement for the container 120 and may, in addition to storing data representing the integrity measurement, contain data representing one or more of the following: an identifier for an event associated with the integrity measurement; a timestamp; an identifier for a type, or category, of the integrity measurement; and so forth. In accordance with further example implementations, a workload integrity log 137 may contain integrity measurements for multiple containers 120. Moreover, in accordance with further example implementations, a given entry of the workload integrity log 137 may store multiple measurements of a container 120. Regardless of the particular organization of the logged integrity measurements, in general, load-time and run-time integrity measurements for the containers may be logged and stored in the memory 128.

As depicted in FIG. 1, in addition to the workload integrity log(s) 137, the memory 128 may also store other data 136 and machine-executable instructions 132. One or multiple processors 124 may execute the machine-executable instructions 132 for purposes of forming one or multiple software components that are discussed herein, such as a container engine 160, a container 120, an operating system 125 and a container measurement agent 164 (herein called "the agent 164").

For the example implementation depicted in FIG. 1, the computer network 100 includes one or multiple remote verifiers 195, which may communicate with the computer platforms 110 over network fabric 180 for purposes of providing attestation requests to the computer platforms 110. As part of the attestation, when challenged by a remote verifier 195, the computer platform 110, in accordance with example implementations, may submit the workload integrity log 137 along with an authenticated digest of hashes 153 as proof of the authenticity of the integrity measurements in the workload integrity log 137.

In general, the network fabric 180 may include components and use protocols that are associated with one or multiple types of communication networks, such as (as examples) Fibre Channel networks, iSCSI networks, ATA over Ethernet (AoE) networks, HyperSCSI networks, Gen-Z fabrics, dedicated management networks, local area networks (LANs), wide area networks (WANs), global networks (e.g., the Internet), wireless networks, or any combination thereof.

In accordance with example implementations, the agent 164 is constructed to take load-time and run-time container integrity measurements, log the integrity measurements in one or multiple workload integrity logs 137 and store hashes 153 that represent the integrity measurements in a secure memory of the computer platform 110, such as a platform configuration register (PCR) memory 151. As mentioned above, a signed digest of the hashes 153 may be used by a remote verifier 195 to prove that the logged integrity measurements are authentic (i.e., used to prove that the logged integrity measurements have not been subject to tampering or otherwise compromised).

For the example implementation of FIG. 1, the PCR memory 151 is a trusted, secure memory that is part of the TPM 150. It is noted that the TPM 150 is one example of a trusted security module. The computer platform 110 may use any of a number of different trusted security modules, in accordance with the many possible implementations. Depending on the particular implementation, the security module may be a hardware-based security module, such as a TPM; or, in accordance with further implementations, the security module may be a virtual security module, such as, for example, a virtual TPM (vTPM) that is implemented via software. Regardless of whether the security module is implemented in hardware, firmware or software, the security module has a secure memory for storing hashes that represent measurement logs.

In accordance with example implementations in which the security module is implemented in hardware, the module may be an integrated circuit package (or "chip") that resides on the motherboard of the computer platform 110 and may be separate from the processors 124 of the computer platform 110. The security module is generally tamper-resistant and is designed according to industry standards to provide security functions while also resisting tampering and malicious software. Moreover, in accordance with example implementations, the security module may contain a cryptographic processor (e.g., a dedicated microprocessor or microprocessor core for performing cryptographic operations) that is designed according to industry standards to provide security functions while also resisting tampering and malicious software.

As depicted in FIG. 1, in accordance with some implementations, the security module may be a TPM that is commercially available from such vendors as Infineon Technologies, Nuvoton and STMicroelectronics. As other examples, a security module may be a firmware-based security co-processor, such as a TPM implemented in ARM Trustzone, which is available from ARM Ltd. of Cambridge, UK or Intel SGX, which is available from Intel of Santa Clara, CA.

The PCR memory 151 represents the memory space of one or multiple platform configuration registers (PCRs) of the TPM 150. A particular PCR may, for example, correspond to a workload integrity log 137 and store a hash 153 that should correspond to a current state of the workload integrity log 137 and also correspond to the sequence in which the logged integrity measurements were added to the workload integrity log 137. In accordance with example implementations, the agent 164 logs one or multiple integrity measurements in the workload integrity log 137 and then extends the PCR memory 151. In this context, "extending the PCR memory" generally refers to modifying the content of the PCR memory 151 so that the modified content represents both the latest measurement(s) and a ledger of measurements leading to the latest measurement(s).

In accordance with example implementations, the agent 164 may extend the PCR memory 151 for a new integrity measurement through the use of a "PCR extend" command. Execution of the PCR extend command causes a hash to be calculated based on the current content of the PCR and new integrity measurement(s), and this calculated hash is then stored in the PCR memory 151 in place of the current content. As such, the hash value may be used by a remote verifier 195 to authenticate the workload integrity log 137, as the hash value is unique for the current version of the workload integrity log 137 and the sequence in which the workload integrity log 137 was changed to arrive at the current version. In accordance with example implementations, in response to an attestation request from a remote verifier 195, the TPM 150 may sign the PCR memory content to form an authenticated digest that is sent to the verifier 195, along with the data representing the current version of the workload integrity log 137.

The container 120 of FIG. 1 represents an instantiated container that corresponds to a container image that may be specified by a build file. The build file may designate one or multiple layers of the image, which are shared by other containers. In accordance with some implementations, at load time, the container engine 160 may start up, or instantiate, a given container 120 based on its corresponding build file, in response to a communication from a container orchestrator 190. In this manner, the container orchestrator 190 may start up one or multiple containers 120 on one or multiple nodes to form a corresponding group, or cluster, of nodes for purposes of performing an activity that is set up by user through the container orchestrator 190.

As described herein, in accordance with example implementations, the agent 164 takes load-time and run-time integrity measurements 174 (also called "measurements 174" herein) for a given container 120; stores the integrity measurements 174 in a workload integrity log 137; and in accordance with example implementations, for each integrity measurement 174, the agent 164 communicates with the TPM 150 (as depicted by reference numeral 176) to correspondingly extend the PCR memory 151. The "load-time" integrity measurements refer to measurements of the container image before the container 120 is instantiated, and the "run-time" integrity measurements refer to measurements of the instantiated container's overlay file system.

FIG. 1 illustrates example container-related data, or information, which may be measured by the agent 164 to provide corresponding integrity measurements 174 in accordance with example implementations: container image layers 166; container layers 168 of the instantiated container's overlay file system; container metadata 170 (i.e., metadata describing characteristics of the instantiated container 120); and container image metadata 172 (i.e., metadata describing characteristics of the container image).

The agent 164 may take a load-time integrity measurement in response to an event that corresponds to the start-up, or instantiation, of a container 120. For example, in accordance with example implementations, the agent 164 may "hook" into the start-up of a container 120 for purposes of taking one or multiple load-time integrity measurements before the container 120 is instantiated, and for purposes of extending the PCR memory 151 based on the integrity measurement(s) 174. In this context, "hooking" into the start-up refers to the agent 164 intervening in the start-up of the container 120 to place a hold on the start-up, which allows the agent 164 to perform a set of measurementrelated actions before the agent 164 that releases the hold and allows the start-up of the container 120 to proceed. The hooking into the start-up of the container 120 may occur in a number of different ways, in accordance with the many possible implementations. For example, the agent 164 may be a registered plug-in of the container engine 160 or container orchestrator 190.

In general, each instantiated container 120 is built from a corresponding immutable, container image that has container image layers 166. In this manner, the container image contains a base image layer and possibly one or multiple upper, intermediate layers. Moreover, each instantiated container 120 has an overlay file system that contains multiple container layers 168: lower immutable layers that correspond to the container image and form a lower directory of the overlay file system; and an upper container layer that forms an upper directory of the overlay file system and corresponds to the read/write workspace for the container 120.

To benefit from the efficiency of container image layer sharing, the agent 164, in accordance with example implementations, may measure a container image layer 166 in response to the instantiation of a particular container 120 and then reuse the measurement for another container image (corresponding to another container 120 instantiation) that shares the layer 166. In accordance with example implementations, the agent 164 may determine multiple measurements for a given container image layer 166. For example, the agent 164 may determine hashes for corresponding individual files or corresponding groups of files of the container image layer 166.

In accordance with further example implementations, the agent 164 may determine a single measurement (e.g., a single hash) for the entire container image layer 166. For example, in accordance with some implementations, the agent 164 may determine hashes for the individual files, and then determine a single hash (i.e., the measurement) for the container image layer 166 over the concatenation of the file hashes. An advantage of a single hash for the layer measurement is that storage space in the workload integrity log 137 is conserved. An advantage of having multiple hash values as measurements of the container image layer 166 is that a finer granularity is provided, allowing a later analysis of the measurement to identify a particular file or group of files, which has been compromised. Depending on the particular implementation, the agent 164 may determine measurement(s) for a single container image layer 166 (e.g., the base layer); or determine measurement(s) for each of multiple image layers 166 (e.g., measurement(s) for each of the base layer and each of certain intermediate layers of the container image, or measurement(s) for each and every layer 166 of the container image).

The agent 164 may take load-time measurements other than layer-oriented measurements. For example, the load-time measurements may include a measurement of container image metadata 172. In general, the container image metadata 172 represents characteristics or attributes of the container image. The agent 164 may read the container image metadata 172 from one or multiple sources, such as the container engine 160, the container orchestrator 190, the operating system 125, or another entity. In accordance with some implementations, a measurement of the container image metadata 172 may involve the agent 164 reading the metadata 172 from one or multiple sources and then creating a tuple of entries (i.e., one entry per metadata category) that forms the corresponding measurement. A remote verifier 195 may, for example, match metadata values against reference values or may apply policies in making relatively more complex decisions on the metadata values that are contained in the measurement.

The run-time measurements may include the measurement of one or multiple layers 168 of the instantiated container's overlay file system. The upper directory of the container (i.e., the container layer) is dynamic, as it is the work directory of the application, which may be subject to many reads and writes during the lifecycle of the container 120. In accordance with some implementations, because of the dynamic nature of the container layer, the agent 164 may determine hash values for individual files of the container layer, and these hash values may form corresponding measurements for the container layer. The measurement of individual files allows flexibility for the remote verifier 195 to apply policies, like ignoring files or directories (e.g. log or cache directories), verifying specific files and/or directories (e.g., specific executable files), and so forth.

In accordance with some implementations, the run-time measurements may include measurements of one or multiple layers of the lower directory of the instantiated container's overlay file system (i.e., the immutable container image-derived layers below the container layer). Depending on the particular implementation, the agent 164 may, for a given layer of the lower directory, determine measurements for individual files or may determine a measurement for the entire layer. Moreover, the agent 164 may determine measurement(s) for the base layer of the lower directory, determine measurement(s) for selected layers of the lower directory, or determine measurement(s) for each of multiple layers of the lower directory, depending on the particular implementation.

The agent 164 may take measurements of the instantiated container 120, other than layer-oriented measurements. For example, in accordance with example implementations, the run-time integrity measurements may include integrity measurements of metadata that represents characteristics or attributes of the instantiated container 120. Such metadata measurements may be later examined by a remote verifier 195 (by applying value comparisons and policies) for such purposes as determining whether the container 120 has the expected number and order of layers, whether the container 120 is behaving as expected, and so forth.

Figure 2:
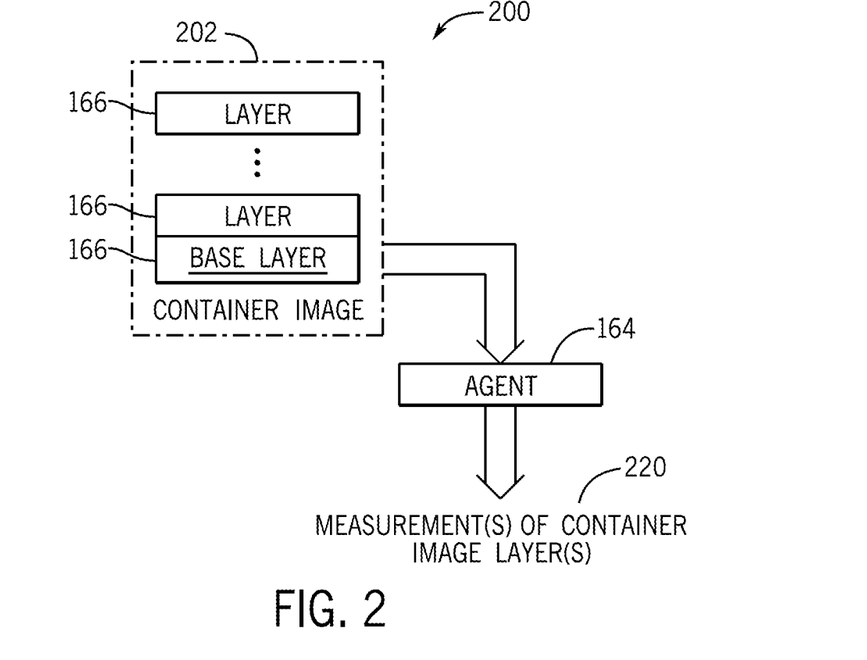
FIG. 2 is an illustration of the agent measuring one or multiple layers of a container image according to an example implementation.

FIG. 2 is an illustration 200 depicting the agent 164 taking one or multiple load-time measurements 220 of a container image 202, in accordance with some implementations. For this example, the container image 202 includes a base layer 166, as well as one or multiple upper layers 166. The layers 166 are immutable and as such, hashes of the layers 166 as well as hashes produced by combining hashes derived from individual layers 166 should correspond to reference hashes. As mentioned above, in accordance with some implementations, the measurement 220 may be a hash value for a specific layer 166, may be a hash value for a specific group of layers 166, may be a hash value for all of the layers 166, and so forth. Moreover, a hash value for a given layer 166 may be derived based on the binary of the entire layer 166, may be derived based on hashes for individual files of the layer 166, may be derived based on hashes for groups of files of the layer, and so forth.

Figure 3:
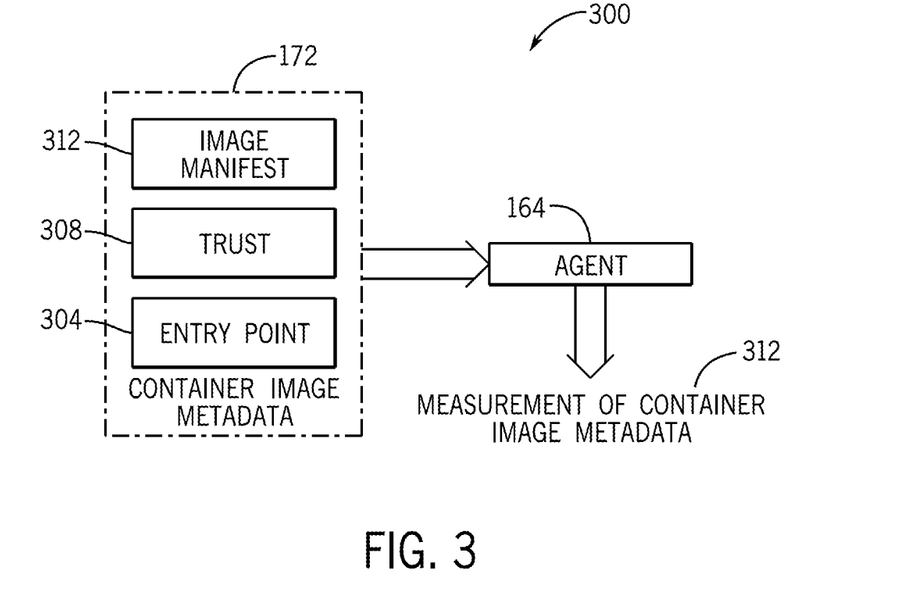
FIG. 3 is an illustration of the agent measuring metadata representing information about the container image according to an example implementation.

FIG. 3 is an illustration 300 of the agent 164 taking a measurement 312 of the container image metadata 172, according to an example implementation. The measurement 312 may be tuple of entries, which correspond to one or multiple container image metadata 172 entries. FIG. 3 illustrates three example container image metadata 172 entries: image manifest metadata 312, trust metadata 308 and entry point metadata 304. As examples, the measurement 312 may be a tuple of all three entries 304, 308 and 312; a tuple of container image metadata 172 entries other than or in addition to the entries 304, 308, 312; and so forth. For the specific container image metadata 172 examples that are illustrated in FIG. 3, the entry point metadata 304 may represent, for example, a default command that is executed when a container instantiation 120 begins, or starts. The trust metadata 308 may represent, for example, a signature and/or a certificate that is associated with the container image, using a particular mechanism like Docker Content Trust or Docker Notary. In general, the trust metadata 304 allows verification of both the integrity and the publisher of all of the data received from a registry over any channel.

The image manifest metadata 312 may, for example, represent information about the container image itself and the registry from which the container image was downloaded. In general, a remote verifier 195 may examine the image manifest metadata 312 to verify whether the container image was downloaded from a specific registry. The measurement 312 may include metadata from other and/or different metadata categories, in accordance with further implementations.

Figure 4:
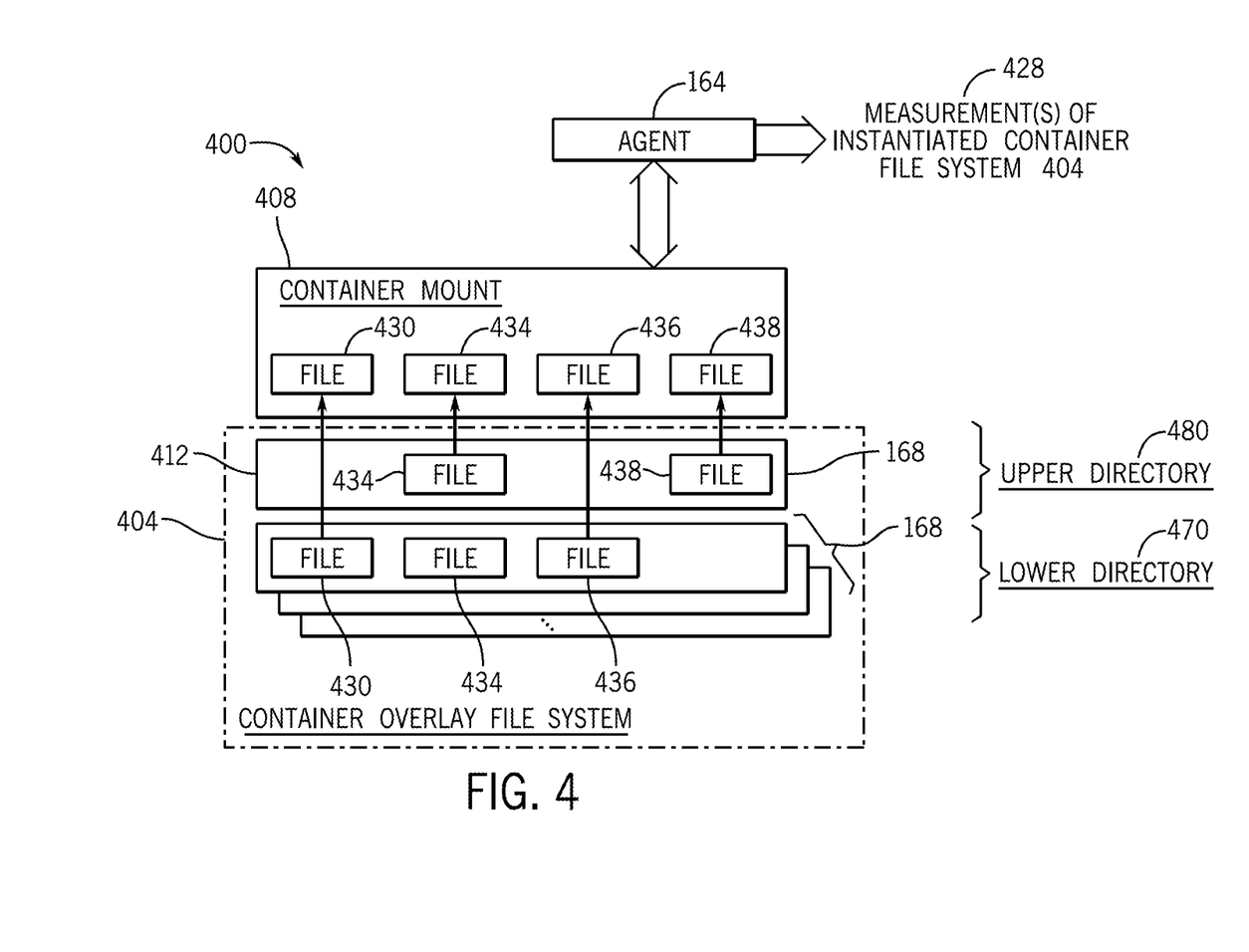
FIG. 4 is an illustration of the agent measuring one or multiple layers of a container's overlay file system according to an example implementation.

FIG. 4 is an illustration 400 of the agent 164 taking one or multiple run-time measurements 428 of an instantiated container's overlay file system 404. The overlay file system 404 for this example includes lower layers 168 that correspond to the container image layers 166 and form a lower directory 470 and an upper layer 168 that corresponds to an upper container layer 412, which forms an upper directory 480. The container layer 412 is dynamic in nature in that the files of the layer 412 may be written, deleted, created, and so forth. For the illustration 400, there are four files 430, 434, 436 and 438 visible from a merged directory 408 that corresponds to an operating system mount point. Although not part of the container layer 412, the files 430 and 436 are read-only files from the lower directory 470. Although the file 434 cannot be changed in the lower directory 470, for this example, the file 434 is part of the container layer 412, and as such, the version of the file 434 in the container layer 412 may be different from the version in the lower directory 470. As also depicted in FIG. 4, the file 438 exists in the upper directory 480 and does not have a counterpart in the lower directory 470.

In accordance with some implementations, the agent 164 may take one or multiple run-time measurements 428 of the container's overlay file system 404. For example, the agent 164 may determine hash or a set of hashes for a particular layer 168 of the lower directory 470; and the hash(es) may correspond to measurement(s) of the layer 166. The agent 164 may take similar measurements of multiple or all layers 168 of the lower directory 470, in accordance with example implementations. The agent 164 may also, in accordance with example implementations, measure the container layer 412 of the upper directory 480. For example, the agent 164 may calculate hashes for individual files and/or directories of the container layer 412, and these hashes may correspond to the measurements 428. Therefore, the agent 164 may (as examples) take one or more of the following measurements 428 of the overlay file system 404: measurement(s) 428 of a particular layer 168 of the lower directory 470; measurement(s) 428 of multiple layers 168 of the lower directory 470; measurement(s) 428 of all of the layers 168 of the lower directory 470; measurement(s) 428 of files of the container layer 412 of the upper directory 480; and/or measurement(s) 428 of directories or groups of files of the container layer 412 of the upper directory 480.

Figure 5:
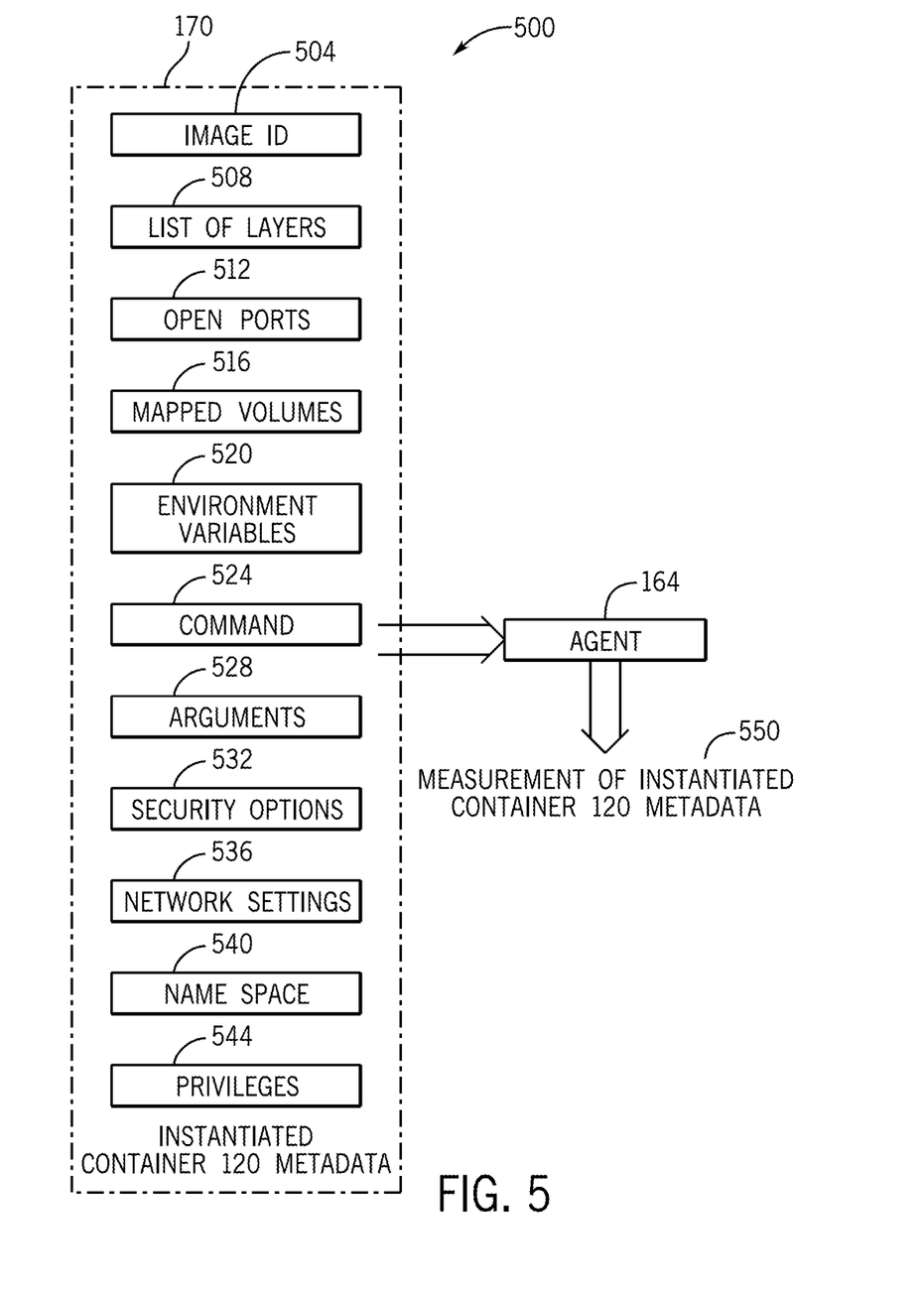
FIG. 5 is an illustration of the agent measuring metadata representing information about an instantiated container according to an example implementation.

FIG. 5 is an illustration 500 of the agent 164 taking a measurement 550 of metadata 170 of the instantiated container 120 according to an example implementation. As an example, the measurement 550 may be a tuple of metadata entries, which correspond to image identification (ID) metadata 504, layer list metadata 508, open ports metadata 512, mapped volumes metadata 516, environment variables metadata 520, command metadata 524, arguments metadata 528, security options metadata 532, network settings metadata 536, name space metadata 540 and privileges metadata 544.

The image ID metadata 504 represents an identifier for the image that is used as the base for the container 120. The identifier may be used to associate the image with a known measured image. The layer list metadata 508 represents a list of layers that form the lower directory of the container's overlay file system. The open ports metadata 512 represents the number of open ports for the container 120 and may be used to verify that the container 120 is not opening more ports than the ones expected for the specific workload. The mapped volumes metadata 516 represents the mapped volumes for the container 120 and may be used to verify the container's access to the host file system.

The environment variables metadata 520 represents environment variables used by the container 120 and may be used to verify a container's access to host information. The command metadata 524 represents the commands used by the container 120 and may be used to verify whether the container 120 is executing with the expected application.

The arguments metadata 528 represents arguments that are used by the container 120 and may be used to verify whether the container 120 is executing with the expected arguments. The security options metadata 532 represents security options (e.g., security module settings, such as ApparmorProfile settings, or security feature settings of an operating system kernel, such as SECComp settings) that are used by the container 120 and may be used to, for example, verify whether or not the container 120 is bypassing native security mechanisms.

The network settings metadata 536 represents network settings, such as a dynamic name server (DNS), network type, hosts, and so forth, and may be used to verify whether or not the container 120 is communicating with expected entities. The name space metadata 540 may be used to verify whether or not a container 120 is running on an isolated namespace. The privileges metadata 544 may be used to verify whether or not the container 120 is escalating privileges.

In accordance with further example implementations, the agent 164 may take metadata-related measurements of the instantiated container from other and/or different metadata categories.

Figure 6:
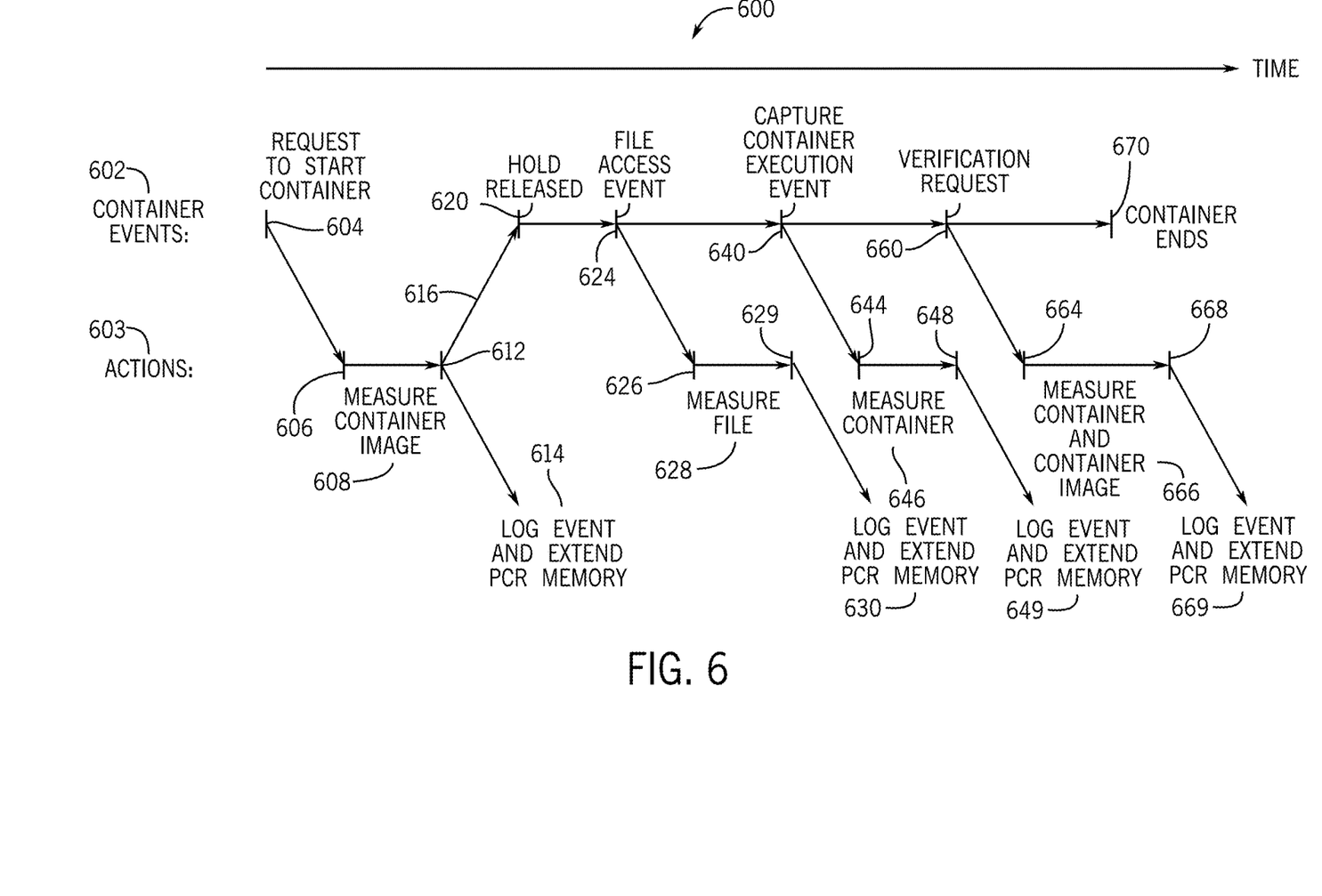
FIG. 6 illustrates a timeline of container-related measurements and their corresponding triggers over an example lifecycle of a container according to an example implementation.

FIG. 6 depicts an example timeline 600 of triggers, or events 602, which may be associated with a container 120 over its lifecycle and the corresponding actions 603 that may be taken by the agent 164 in response to the events 602. As described further below, the actions 603 include the agent 164 taking and logging measurements, and include the agent 164 extending the PCR memory 151.

Referring to FIG. 6, the initial event occurs at time 604 at which the container engine 160 requests to start the container 120. This event, in accordance with example implementations, causes the agent 164 to, from time 606 to time 612, measure the container image, as depicted at reference numeral 608. During this time period, the agent 164 holds off the start-up of the container 120. As such, as described herein, as part of the container image measurement, the agent 164 may measure one or multiple layers of the container image and may measure container image metadata. At time 612, the measurement of the container image is complete, and the agent 164 may then log the start-up event measurement(s) and extend the PCR memory, as depicted at reference numeral 614. After the PCR memory is extended, the agent 164 may release the hold allowing the container 120 to start-up, as depicted at time 620.

Continuing the example timeline 600, other events may trigger measurements by the agent 164. For example, at time 624, a file access event occurs (e.g., a file is read from or written to the container file system), which causes the agent 164 to, from time 626 to time 629 measure the file, as depicted at 628; and then the agent 164 logs the file access event measurement and extends the PCR memory, as depicted at reference numeral 630.

Next, in the example timeline 600, a capture container execution event 640 occurs at time 640. It is noted that the container capture execution event may arise according to a schedule (e.g., a periodic schedule). In other words, in accordance with example implementations, at certain pre-designated times, a container capture event occurs to cause the agent 164 to measure the container 120, as depicted at reference numeral 646, and therefore, take one or multiple run time container measurements. The capture container execution event may be attributable to other causes, in accordance with further implementations. For example, a capture container event may arise due to the start-up of another instance of the same container 120. The measurement 646 of the container may involve the agent 164 acquire run time measurements of the container file system, which may include measurements of files of the container layer; one or multiple measurements of a layer of the lower directory; one or multiple measurements of each layer of the lower directory; and so forth, as described herein. The agent 164 may then log the container capture event measurement(s) and extend the PCR memory, as depicted at reference numeral 649.

FIG. 6 further depicts an example verification request event at time 660. For example, a verification request may arise as part of remote attestation. In response to the verification request, the agent 164 may, in accordance with example implementations, measure (as depicted at reference numeral 666) the container image (e.g., container image layer measurements and container image metadata measurements) and measure the container file system (e.g., container layer file measurements and lower directory layer measurements) from time 664 to time 668. The agent 164 may then log the verification request measurements and extend the PCR memory, as depicted at reference numeral 669.

At time 670, the container 120 for the example timeline 600 ends. In accordance with example implementations, in response to the container end event, several actions may be performed by the agent 164, such as recording the event (i.e., recording the termination of the container) in the workload integrity log 137 and/or in a system log; resetting the PCR memory after signing the final PCR values; archiving the log; and so forth. It is noted that the actions 603 of the agent 164 and the triggering events 602 of FIG. 6 are merely examples, as a given container 120 may have different, fewer or more triggering events. In general, the agent 164 may respond to any of a number of different events, such as operating system, system calls, for purposes of measuring run-time activities of the container 120, such as accessing files (as described above), mounting, accessing networks, and so forth. In general, these events trigger container run-time measurements by the agent 164 based on configured policies. Moreover, as also set forth above by way of an example, the actions 603 may be triggered by explicit requests to perform run-time measurements, such as a request from a remote verifier, a user, a capture container event request, or, in general, any authorized entity. This allows flexibility to perform periodic and/or on-demand measurements in a relatively complex system, where measuring all aspects of a container may not be practical.

Figure 7:
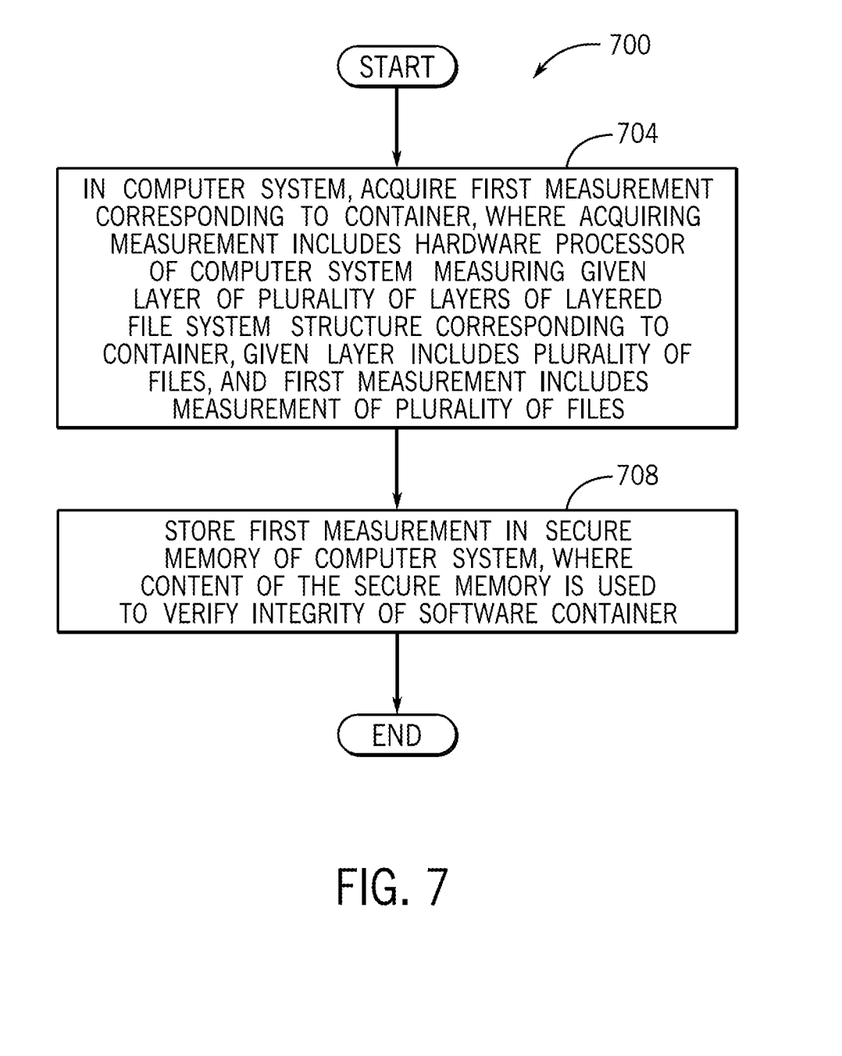
FIG. 7 is a flowchart depicting a process to acquire and store a measurement corresponding to a software container according to an example implementation.

Referring to FIG. 7, in accordance with example implementations, a process 700 includes, in a computer system, acquiring (block 704) a first measurement that corresponds to a software container. Acquiring the measurement includes a hardware processor of the computer system measuring a given layer of a plurality of layers of layered file system structure corresponding to the software container. The given layer includes a plurality of files, and the first measurement includes a measurement of the plurality of files. The process 700 includes storing (block 708) the first measurement in a secure memory of the computer system. A content of the secure memory is used to verify an integrity of the software container.

Figure 8:
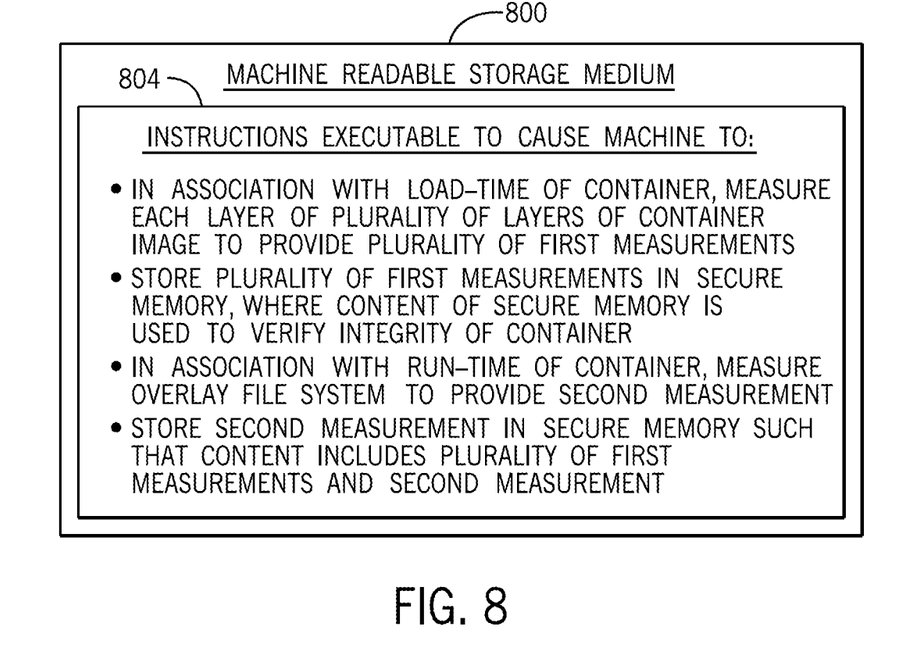
FIG. 8 is an illustration of a non-transitory machine-readable storage medium that stores instructions to cause a machine to measure layers of a container image, measure an overlay file system associated with a container, and store the measurements in a secure memory according to an example implementation.

Referring to FIG. 8, in accordance with example implementations, a machine-readable storage medium 800 stores instructions 804. The instructions 804, when executed by a machine, cause the machine to, in association with a load-time of a container, measure each layer of a plurality of layers of a container image to provide a plurality of first measurements; and store the plurality of first measurements in a secure memory. A content of the secure memory is used to verify an integrity of the container. The instructions 804, when executed by the machine, further cause the machine to, in association with a run-time of the container, measure an overlay file system to provide a second measurement; and store the second measurement in the secure memory such that the content includes the plurality of first measurements and the second measurement.

Figure 9:
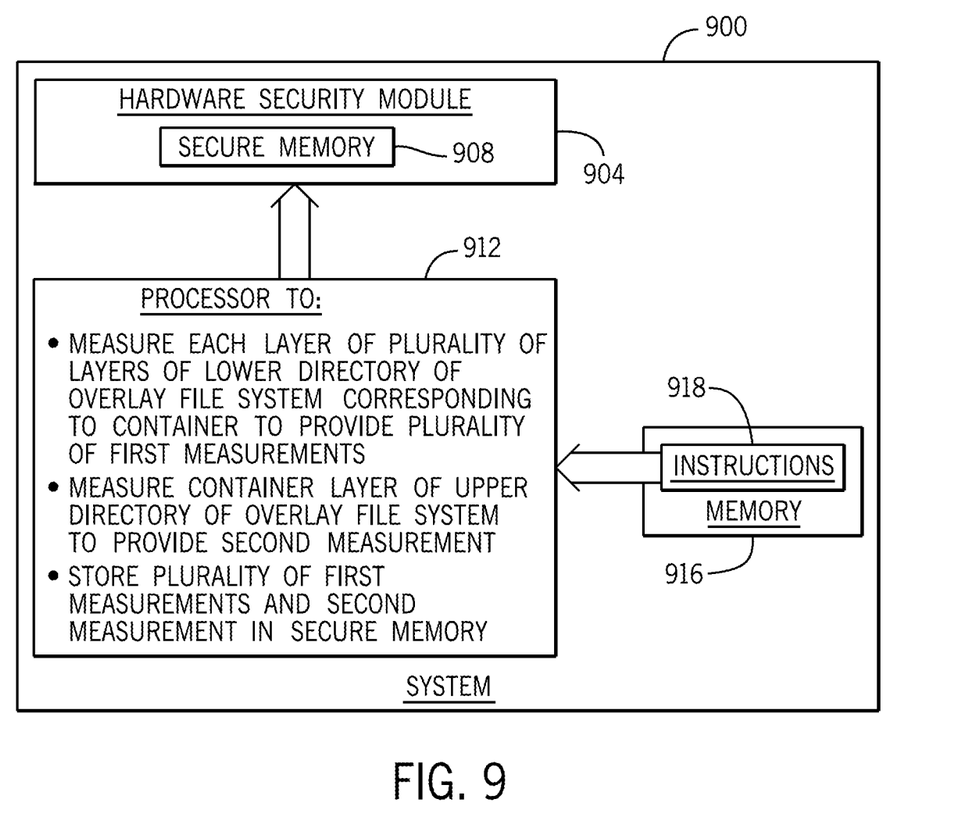
FIG. 9 is a schematic diagram of a system that includes a processor to measure layers of an upper directory and a lower directory of an overlay file system that corresponds to a container, and store the measurements a secure memory according to an example implementation.

Referring to FIG. 9, in accordance with example implementations, a system 900 includes a hardware security module 904, a processor 912 and a memory 916. The hardware security module 904 includes a secure memory 908 to store content, which is used to verify an integrity of a container. The memory 916 stores instructions 918 that, when executed by the processor 912, cause the processor 912 to measure each layer of a plurality of layers of a lower directory of an overlay file system corresponding to the container to provide a plurality of first measurements; and measure a container layer of an upper directory of the overlay file system to provide a second measurement. The instructions 918, when executed by the processor 912, further cause the processor 912 to store the first measurements and the second measurement in the secure memory 908.

In accordance with example implementations, the first measurement corresponds to an image of the container, and the given layer corresponds to a baser layer of the plurality of layers. A particular advantage is that the measurement of a base layer that is used that is used by multiple container images may be reused.

In accordance with example implementations, metadata that is associated with a container is measured to provide a second measurement, and the second measurement is stored in the secure memory such that the content includes the first measurement and the second measurement. A particular advantage is that metadata may be used to determine whether a structure of the container image has changed or determine whether the instantiated container is behaving as expected.

In accordance with example implementations, the metadata may be associated with an image of a container. A particular advantage is that the metadata may be used to confirm a particular layer structure of the container image to verify whether a layer has been omitted, a layer has been added, a layer ordering has changed, and so forth.

In accordance with example implementations, the metadata may include data representing at least one of an entry point command corresponding to a request to start an instantiation of the container, a signature corresponding to the image, a certificate corresponding to the image, or a manifest of the image. A particular advantage is that data in addition to a measurement of a particular layer of the container may be used to validate the container image.

In accordance with example implementations, the metadata may be associated with an instantiation of the container. A particular advantage is that the metadata may be used to verify that the container is behaving as expected.

In accordance with example implementations, measurement of the metadata may be performed in response to a request to start another instantiation of the container. A particular advantage is that both dynamic and static aspects of the container may be verified between container instantiations.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   in a computer system, acquiring a first integrity measurement corresponding to a software container, wherein acquiring the first integrity measurement comprises a hardware processor of the computer system measuring a given layer of a plurality of layers of a layered file system structure corresponding to the software container, the given layer comprises a plurality of files, and the first integrity measurement comprises an integrity measurement of the plurality of files; and
   storing the first integrity measurement in a secure memory of the computer system, wherein a content of the secure memory is used to verify an integrity of the software container.

2. The method of claim 1, wherein:
   the first integrity measurement corresponds to an image of the container; and
   the given layer corresponds to a base layer of the plurality of layers.

3. The method of claim 1, further comprising:
   initiating the acquiring of the first integrity measurement of the given layer in response to a request to start an instantiation of the software container.

4. The method of claim 1, further comprising:
   measuring metadata associated with the container to provide a second integrity measurement; and
   storing the second integrity measurement in the secure memory such that the content includes the first integrity measurement and the second integrity measurement.

5. The method of claim 4, wherein:
   the metadata is associated with an image of the container.

6. The method of claim 5, wherein the metadata comprises data representing at least one of an entry point command corresponding to a request to start an instantiation of the container, a signature corresponding to the image, a certificate corresponding to the image, or a manifest of the image.

7. The method of claim 4, further comprising:
   performing the measuring of the metadata and the measuring of the given layer in response to a verification request.

8. The method of claim 4, wherein:
   the metadata is associated with an instantiation of the container.

9. The method of claim 8, wherein the metadata comprises data representing at least one of an image identifier for a base layer of the plurality of layers, a list of the plurality of layers, an open port number, a mapped volume identifier, an environment variable, a command, an argument, a security option, a network setting, a name space or a privilege.

10. The method of claim 8, further comprising:
    performing the measuring of the metadata during a run-time of the container corresponding to the instantiation of the container; and
    performing the measuring of the given layer before the instantiation of the container.

11. The method of claim 8, further comprising:
    performing the measuring of the metadata in response to a request to start another instantiation of the container.

12. The method of claim 1, wherein acquiring the first integrity measurement comprises applying a hash function to content of the given layer to provide the first integrity measurement.

13. A non-transitory machine-readable storage medium that stores instructions that, when executed by a machine, cause the machine to:
    in association with a load-time of a container, measure each layer of a plurality of layers of a container image to provide a plurality of first integrity measurements;
    store the plurality of first integrity measurements in a secure memory, wherein a content of the secure memory is used to verify an integrity of the container;
    in association with a run-time of the container, measure an overlay file system to provide a second integrity measurement; and
    store the second integrity measurement in the secure memory such that the content includes the plurality of first integrity measurements and the second integrity measurement.

14. The storage medium of claim 13, wherein the instructions, when executed by the machine, further cause the machine to measure a plurality of layers of the overlay file system corresponding to the image and measure a container layer of the overlay file system.

15. The storage medium of claim 13, wherein the instructions, when executed by the machine, further cause the machine to measure metadata representing the overlay file system.

16. The storage medium of claim 15, wherein the metadata comprises data representing at least one of an image identifier for a base layer of the plurality of layers, a list of the plurality of layers, an open port number, a mapped volume identifier, an environment variable, a command, an argument, a security option, a network setting, a name space or a privilege.

17. The storage medium of claim 13, wherein the instructions, when executed by the machine, further cause the machine to apply a hash function to the content of the each layer to provide the plurality of first integrity measurements.

18. A system comprising:
    a hardware security module comprises a secure memory to store content used to verify an integrity of a container;
    a processor; and a memory to store instructions that, when executed by the processor, cause the processor to:
measure each layer of a plurality of layers of a lower directory of an overlay file system corresponding to the container to provide a plurality of first integrity measurements;
measure a container layer of an upper directory of the overlay file system to provide a second integrity measurement; and
store the plurality of first integrity measurements and the second integrity measurement in the secure memory.

19. The system of claim 18, wherein the instructions, when executed by the processor, further cause the processor to:
measure first metadata representing information about the container to provide a third integrity measurement;
measure second metadata representing information about an instantiation of the container to provide a fourth integrity measurement; and
store the third integrity measurement and the second integrity measurement in the secure memory.

20. The system of claim 19, wherein the instructions, when executed by the processor, further cause the processor to:
measure the first metadata in response to a command to start the instantiation of the container; and
measure the second metadata in response to a predetermined event.

21. The system of claim 20, wherein the predetermined event comprises an event initiated at periodic intervals, or an event to start another instantiation of the container.

22. The system of claim 18, wherein the instructions, when executed by the processor, further cause the processor to measure a file of an instantiation of the container in response to a file access request to provide a third integrity measurement, and store the third integrity measurement in the secure memory.

23. The system of claim 18, wherein the plurality first integrity measurements comprise hashes that represent evidence that may be analyzed to evaluate the integrity of the software container.

* * * * *